United States Patent
Horiuchi et al.

(10) Patent No.: US 7,568,079 B2
(45) Date of Patent: *Jul. 28, 2009

(54) INFORMATION PROCESSOR, METHOD THEREOF, PROGRAM FOR EXECUTING THE METHOD, RECORDING MEDIUM STORING THE PROGRAM AND INFORMATION STORAGE

(75) Inventors: Naoaki Horiuchi, Tsurugashima (JP); Motooki Sugihara, Tsurugashima (JP); Tetsuya Kawahara, Tokorozawa (JP); Harumi Nakamura, Tokorozawa (JP); Hideki Nagata, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 330 days.

This patent is subject to a terminal disclaimer.

(21) Appl. No.: 11/142,664

(22) Filed: Jun. 2, 2005

(65) Prior Publication Data

US 2005/0289616 A1   Dec. 29, 2005

(30) Foreign Application Priority Data

Jun. 2, 2004   (JP)   ............................. 2004-164930

(51) Int. Cl.
*G06F 12/00* (2006.01)

(52) U.S. Cl. .................. 711/159; 711/112; 711/154; 725/134

(58) Field of Classification Search ................. 725/134; 711/159

See application file for complete search history.

(56) References Cited

U.S. PATENT DOCUMENTS

| | | | | |
|---|---|---|---|---|
| 5,353,121 A | * | 10/1994 | Young et al. | 725/52 |
| 6,021,390 A | * | 2/2000 | Satoh et al. | 705/1 |
| 6,037,830 A | * | 3/2000 | Mil'shtein et al. | 327/427 |
| 6,788,604 B2 | * | 9/2004 | Yokota et al. | 365/218 |
| 6,983,351 B2 | * | 1/2006 | Gibble et al. | 711/159 |
| 7,017,179 B1 | * | 3/2006 | Asamoto et al. | 725/152 |
| 7,088,910 B2 | * | 8/2006 | Potrebic et al. | 386/83 |
| 7,362,360 B2 | * | 4/2008 | Kim et al. | 348/231.2 |
| 2001/0050875 A1 | * | 12/2001 | Kahn et al. | 365/229 |
| 2002/0100047 A1 | * | 7/2002 | Matoba et al. | 725/46 |
| 2003/0184654 A1 | * | 10/2003 | Kinjo | 348/207.1 |

(Continued)

FOREIGN PATENT DOCUMENTS

JP   11-66694   3/1999

(Continued)

OTHER PUBLICATIONS

Office Action dated Jan 20, 2009 corresponding to Japanese patent application No. 2004-164930 -Notification of Reasons for Rejection with English Translation..

*Primary Examiner*—Hetul Patel
(74) *Attorney, Agent, or Firm*—Kratz, Quintos & Hanson, LLP

(57) ABSTRACT

A storing-reproducing unit 200 recognizes a free space of a contents storage area by a storage-area-administrating device, sets a recording timing duration based on the recognized free space of the contents storage area, and selects a schedule information of a contents to be recorded from recording schedule list information. Hence, frequency of storing the contents in the HDD 270 can be reduced, thereby avoiding that the contents which has not yet watched is erased by self-erasing, so that the contents can be effectively recorded. Therefore, a user can secure flexibility in time in watching the contents.

21 Claims, 8 Drawing Sheets

U.S. PATENT DOCUMENTS

2005/0180580 A1* 8/2005 Murabayashi et al. ......... 381/81
2005/0289635 A1* 12/2005 Nakamura et al. .......... 725/134
2007/0133945 A1* 6/2007 Fukushima et al. ........... 386/95

FOREIGN PATENT DOCUMENTS

| | | |
|---|---|---|
| JP | 2000-175141 | 6/2000 |
| JP | 2000-217063 | 8/2000 |
| JP | 2000-341627 | 12/2000 |
| JP | 2001-167522 | 6/2001 |
| JP | 2002-300484 | 10/2002 |
| JP | 2004-153728 | 5/2004 |
| JP | 2004-153729 | 5/2004 |
| WO | WO 02/28100 A1 | 4/2002 |

* cited by examiner

INFORMATION PROCESSOR, METHOD THEREOF, PROGRAM FOR EXECUTING THE METHOD, RECORDING MEDIUM STORING THE PROGRAM AND INFORMATION STORAGE

BACKGROUND OF THE INVENTION

1. Field of the Invention

The present invention relates to an information processor for storing a contents, a method thereof, a program for executing the method, a recording medium storing the program and an information storage.

2. Description of Related Art

Conventionally, as an information storage for recording a broadcast program, there has been known a storage that a program to be recorded is self-scheduled for recording based on a preset keyword and a user does not need to input manually. As an example of such information storage, there is an information storage that erases stored information when a free space of a storage area of a recording medium in which recorded information is stored becomes small (see document 1: Japanese Patent Laid-Open publication No. Hei 11-66694). In the information storage disclosed in the document 1, when the free space of the storage area of the recording medium to store a broadcast program is small, the information storage runs a search to find and automatically erase the stored information that has been once reproduced or that is low-priority in order to secure the sufficient free space of the storage area.

Incidentally, in the information storage that searches, based on keywords, an EPG (Electric Program Guide) distributed from a broadcast station and the like for a program to be self-scheduled for recording, many programs may be found even for one keyword or many programs may be found as a result of setting a plurality of keywords. If all of the programs are to be stored in the recording medium, the storage area of the recording medium becomes full in a short time. However, even in such a situation, in the information storage disclosed in the document 1, the stored information is self-erased so that the free space of the storage area can be secured. In a case that the storage area is extremely small, and if the recording is repeatedly performed, it is necessary to erase the stored information recorded in the storage area each time of the recordings. Consequently, there occurs problems that, for instance, the user cannot have enough time to watch the recorded information and that the stored information which has not yet been watched is erased.

SUMMARY OF THE INVENTION

An object of the present invention is to provide an information processor for effectively storing information, a method thereof, a program for executing the method, a recording medium storing the program and an information storage.

The information processor of the present invention is an information processor that controls a process for storing information in a storing device includes: a request-information recognizer that recognizes request information for requesting the information to be stored in the storing device; a detail-information recognizer that recognizes detail information about detail of the information to be stored containing data-size information about information quantity of the information; a storage-area recognizer that recognizes a storage area of the storing device; and a storage controller that controls a process for storing the information in the storing device based on the data-size information of the information to be stored and the free space of the storage area upon recognizing a request for storing a plurality of the information based on request information.

The information storage of the present invention includes the above-described information processor of the invention and the storing device for storing the information.

The information-processing method of the present invention is an information-processing method for controlling a process for storing information in a storing device using a computer, the method comprising the steps of the computer: recognizing data-size information about information quantity of the information in accordance with detail information about a detail of the information to be stored and a free space of a storage area of a storing device upon recognizing the request for storing the plurality of information based on the request information for requesting the information to be stored in the storing device; and controlling the process for storing the information in the storing device based on the recognized data-size information and the recognized free space of the storage area.

In the program for information-processing of the present invention, the computer works as the above-described information processor of the invention.

In the program for information-processing of the present invention, the information-processing method disclosed in the claim 18 is executed by the computer.

In the recording medium of the present invention, the above-described program for information-processing of the invention is stored readably by the computer.

DETAILED DESCRIPTION OF PREFERRED EMBODIMENT(S)

An embodiment of the present invention will be described below in reference to attached drawings. In the embodiment, a storing-reproducing unit that includes a data processor having a process controller of the present invention will be exemplified for explanation, but the present invention is not limited thereto and can be applied to any arrangement in which data in a storing device is erased. Incidentally, in the embodiment, a process for storing a contents will also be expressed as a process for recording a contents in the explanation. Manual recording-scheduling request information as specific-data-storing request information that contains a recording start date/time, a recording end date/time and a channel that are input by the user is retrieved. A process for scheduling a recording of a specific contents that is identified by various items of the manual recording-scheduling request information will also be expressed as a manual recording-scheduling process in the explanation. A process for recording based on a manual recording-scheduling will also be expressed as a manually-scheduled-recording processing in the explanation. Self-recording-scheduling request information including a keyword that is textual information input by the user is retrieved. A process for referring to, for instance, EPG (Electric Program Guide) data (described below) and scheduling a recording of the contents that corresponds to the keyword of the self-recording-scheduling request information will also be expressed as a self-recording-scheduling process in the explanation. A process for recording based on the self recording-scheduling will also be expressed as a self-scheduled-recording processing in the explanation.

[Arrangement of Contents Storage-Reproducing System]

Figure 1:
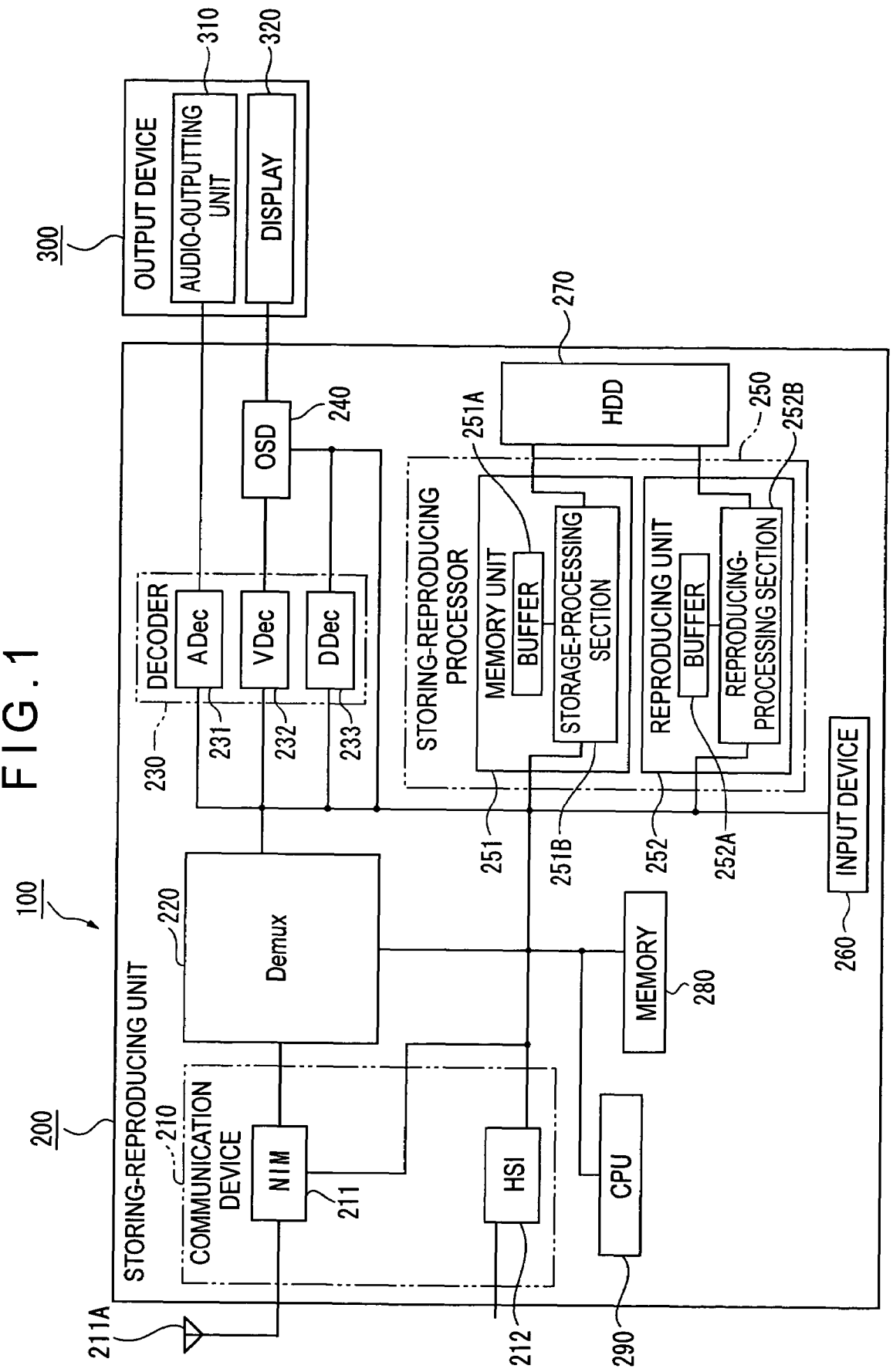
FIG. 1 is a block diagram schematically showing an arrangement of a contents storing-reproducing system according to an embodiment of the present invention.

In FIG. 1, a system indicated by the reference numeral 100 is a contents storing-reproducing system (hereinafter referred to a storing-reproducing system) for storing a contents that is data including audio data, video data, data-broadcasting data such as a TV program and for reproducing the stored contents. The storing-reproducing system 100 includes a storing-reproducing unit 200 and an output device 300.

As the output device 300, a personal computer, a TV set, a portable phone, a PDA (Personal Digital Assistant) can be exemplified. The output device 300 receives the contents that is input from the storing-reproducing unit 200 and outputs. The output device 300 has an audio-outputting unit 310, a display 320 and the like.

The audio-outputting unit 310 is provided with a sound-producing device such as a speaker (not shown). The audio-outputting unit 310 outputs the audio data sent as analog signals from the storing-reproducing unit 200 via the sound-producing device as a sound. Incidentally, the sound-producing device can also output other data such as TV audio data that is received with a TV receiver (not shown).

The display 320 displays the video data, the broadcasting data, the EPG data, synthesized data and the like that are sent as analog signals from the storing-reproducing unit 200. As the video data that is displayed, a video picture of the contents can be exemplified. As the broadcasting data, a caption of the contents and a data broadcast can be exemplified. As the EPG data, a program list in which a title, detail, broadcasting start date/time and the like of the contents to be broadcasted on each channel are listed can be exemplified. As the synthesized data, a synthesized picture in which the caption is overlapped on the video picture of the contents and a video picture in which the data broadcast and the program list are allocated side by side can be exemplified. As the display 320, a liquid crystal display panel, an organic EL (Electro Luminescence) panel, a PDP (Plasma Display Panel), a CRT (Cathode-Ray Tube), an FED (Field Emission Display) and an electrophoretic display panel can be exemplified. Incidentally, the display 320 can also output other data such as TV video data received with the TV receiver.

The storing-reproducing unit 200 retrieves the contents including the audio data, the video data, the data-broadcasting data and the like that are distributed as a TS (Transport Stream) to store and output by the output device 300. The storing-reproducing unit 200 also reproduces the stored contents and outputs from the output device 300. In addition, the storing-reproducing unit 200 self-erases the stored contents. The storing-reproducing unit 200 includes a communication device 210, a demultiplexer (Demux) 220, a decoder 230, an on-screen display (OSD) 240, a storing-reproducing processor 250, an input device 260, a hard disk drive (HDD) 270 as a storing device, a memory 280, a CPU (Central Processing Unit) 290 as a computer and the like.

The communication device 210 retrieves the contents that is input from outside and outputs the contents outward. And the communication device 210 has a network interface module (NIM) 211, a high-speed interface (HSI) 212 and the like.

Connected to the NIM 211 is an antenna 211A for receiving broadcast waves such as terrestrial digital broadcasting and satellite digital broadcasting. The NIM 211 is also connected with the Demux 220, the CPU 290 and the like. Based on the control of the CPU 290, the NIM 211 retrieves the TS that corresponds to the contents selected by the user from a plurality of TSs sent as digital signals from the antenna 211A. The NIM 211 outputs the retrieved TS to the Demux 220.

The HSI 212 is an interface capable of high-speed data processing such as the IEEE (Institute of Electrical and Electronic Engineers) 1394 standard interface. To the HSI 212, the Demux 220, the storing-reproducing processor 250 and the like are connected. The HSI 212 retrieves the TS and a partial TS (described below) that are sent as digital signals from an external device (not shown) provided outside the storing-reproducing unit 200 and outputs to the Demux 220. The HSI 212 also retrieves the partial TS that is output by the storing-reproducing processor 250 and performs a necessary process in order to send as digital signals to the external device (not shown) provided outside the storing-reproducing unit 200.

The Demux 220 retrieves the TS and separates a TS packet from the TS to output. To the Demux 220, the decoder 230, the storing-reproducing processor 250, the CPU 290 and the like are connected. The Demux 220 retrieves the TS from the NIM 211 and HSI 212 based on the control of the CPU 290. The Demux 220 further retrieves the TS packet of various data that correspond to the selected contents from the TS. Specifically, the Demux 220 retrieves a TS packet in which the audio data is embedded (hereinafter referred to as an audio packet), a TS packet in which the video data is embedded (hereinafter referred to as a video packet) and a TS packet in which the data-broadcasting data, the EPG data and the like are embedded (hereinafter referred to as a data packet). The Demux 220 outputs the retrieved audio packet, video packet and data packet to the decoder 230.

Herein, the EPG data is data in which information about the contents of each TS such as a TV program, which can be retrieved by the NIM 211 is described in a text format such as BML (Broadcast Markup Language) and XML (eXtensible Markup Language). In concrete, the EPG data is data having a table structure in which a title, description of detail and the like, broadcasting start date/time, broadcast time length, channel number, genre, series name etc. of a program constitute one data unit.

When the Demux 220 retrieves each TS packet that corresponds to the selected contents from the retrieved TS based on the control of the CPU 290, the Demux 220 restructures the TS packet into the TS having the above-described data structure, i.e. into the partial TS. The Demux 220 then outputs the partial TS to the storing-reproducing processor 250. The Demux 220 also retrieves the partial TS from the HSI 212 and the storing-reproducing processor 250 based on the control of the CPU 290. And the Demux 220 splits the retrieved partial TS into the audio packet, the video packet and the data packet in order to output to the decoder 230.

The decoder 230 is connected to the OSD 240, the CPU 290, the output device 300 and the like. The decoder 230 retrieves each packet from the Demux 220 and outputs the various data embedded in each packet to the OSD 240 and the output device 300. The decoder 230 includes an audio decoder (ADec) 231, a video decoder (VDec) 232 and a data decoder (DDec) 233.

The ADec 231 is connected to the audio-outputting unit 310 of the output device 300. The ADec 231 retrieves the audio packet from the Demux 220 based on the control of the CPU 290. The ADec 231 demodulates the audio data embedded in the audio packet and sends as analog signals to the audio-outputting unit 310 of the output device 300.

The VDec 232 is connected to the OSD 240. The VDec 232 retrieves the video packet from the Demux 220 based on the control of the CPU 290. The VDec 232 demodulates the video data embedded in the video packet and sends to the OSD 240.

The DDec 233 is connected to the OSD 240. The DDec 233 retrieves the data packet from the Demux 220 based on the control of the CPU 290. The DDec 233 demodulates the data-broadcasting data, the EPG data and the like embedded in the data packet and sends to the OSD 240. When the EPG data is embedded in the data packet, the DDec 233 also outputs the EPG data to the memory 280 based on the control of the CPU 290.

The OSD 240 is connected to the CPU 290, the display 320 of the output device 300 and the like. The OSD 240 retrieves the video data from the VDec 232 based on the control of the CPU 290. The OSD 240 also retrieves the data-broadcasting data, the EPG data and the like from the DDec 233. In consequence, the OSD 240 generates the synthesized data to display the video picture of the video data, the caption (for an example) of the data-broadcasting data and the program list (for an example) of the EPG data in a selectively overlapped or allocated manner. The OSD 240 sends the synthesized data as analog signals to the display 320 of the output device 300. Alternatively, the OSD 240 outputs the video data, the data-broadcasting data and the EPG data separately as analog signals to the display 320.

The storing-reproducing processor 250 is connected to the HDD 270, the CPU 290 and the like. The storing-reproducing processor 250 retrieves the partial TS from the Demux 220 to store in the HDD 270. The storing-reproducing processor 250 also retrieves the partial TS stored in the HDD 270 to output to the HSI 212 and the Demux 220. The storing-reproducing processor 250 includes a memory unit 251 and a reproducing unit 252.

The memory unit 251 stores the partial TS from the Demux 220 in the HDD 270. The memory unit 251 has a buffer 251A, a storing-processing section 251B and the like. The buffer 251A temporarily stores the partial TS from the Demux 220. The storing-processing section 251B retrieves the partial TS from the Demux 220 and readably stores in the buffer 251A based on the control of the CPU 290. The storing-processing section 251B reads the partial TS stored in the buffer 251A and outputs to the HDD 270.

The reproducing unit 252 outputs the partial TS stored in the HDD 270 to the HSI 212 and the Demux 220. The reproducing unit 252 has a buffer 252A, a reproducing-processing section 252B and the like. The buffer 252A temporarily stores the partial TS from the HDD 270. The reproducing-processing section 252B retrieves the partial TS from the HDD 270 and readably stores in the buffer 252A based on the control of the CPU 290. The reproducing-processing section 252B reads the partial TS stored in the buffer 252A and outputs to the HSI 212 and the Demux 220.

The input device 260 is connected to the CPU 290 and the like. The input device 260 has various operation buttons and controls (not shown) disposed on, for instance, a front surface of a casing (not shown), which can be used for inputting. By inputting with the operation buttons and controls, for instance, operations of the storing-reproducing unit 200 can be set. In other words, details of recoding and reproducing the contents and of the TS to be received by the NIM 211 can be set. Based on the input, the input device 260 sends various information to the CPU 290 as operation signals, so that the setting is completed. The input device 260 may include a remote controller optical unit that receives the various information sent by a remote controller (not shown) via infrared light and sends to the CPU 290 as operation signals.

The HDD 270 is connected to the CPU 290 and the like. The HDD 270 is controlled by an ATA (AT Attachment) interface. Herein, an arrangement in which the HDD 270 is controlled by the ATA interface is described as an example, but the HDD 270 may be controlled by an IDE (Integrated Drive Electronics) interface or a SCSI (Small Computer System Interface). The HDD 270 includes a contents storage area in which the partial TS of the contents that is input from the memory unit 251 (i.e. the contents itself) is readably stored. As an alternative for the HDD 270, a drive or a driver that can store the various information readably in a recording medium such as a DVD (Digital Versatile Disc), an optical disc and a memory card may be used.

Figure 2:
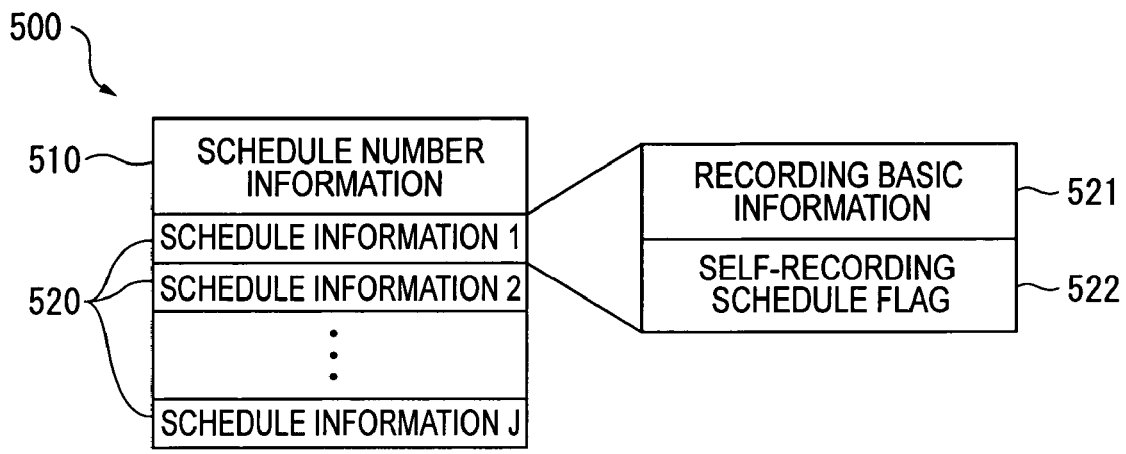
FIG. 2 is a schematic illustration showing a structure of a recording schedule list.
Figure 3:
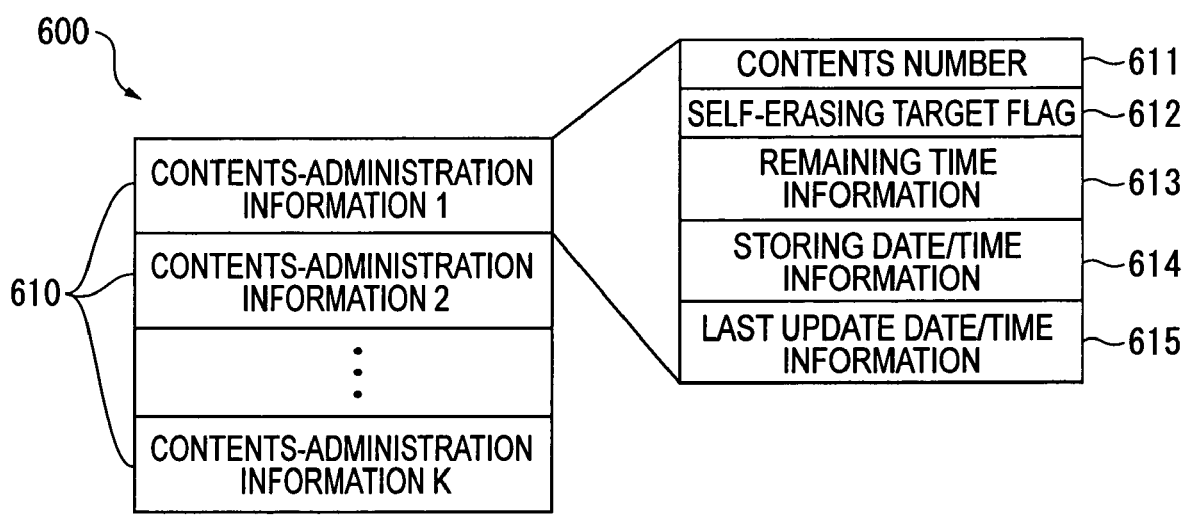
FIG. 3 is a schematic illustration showing a structure of a contents-administration list.
Figure 4:
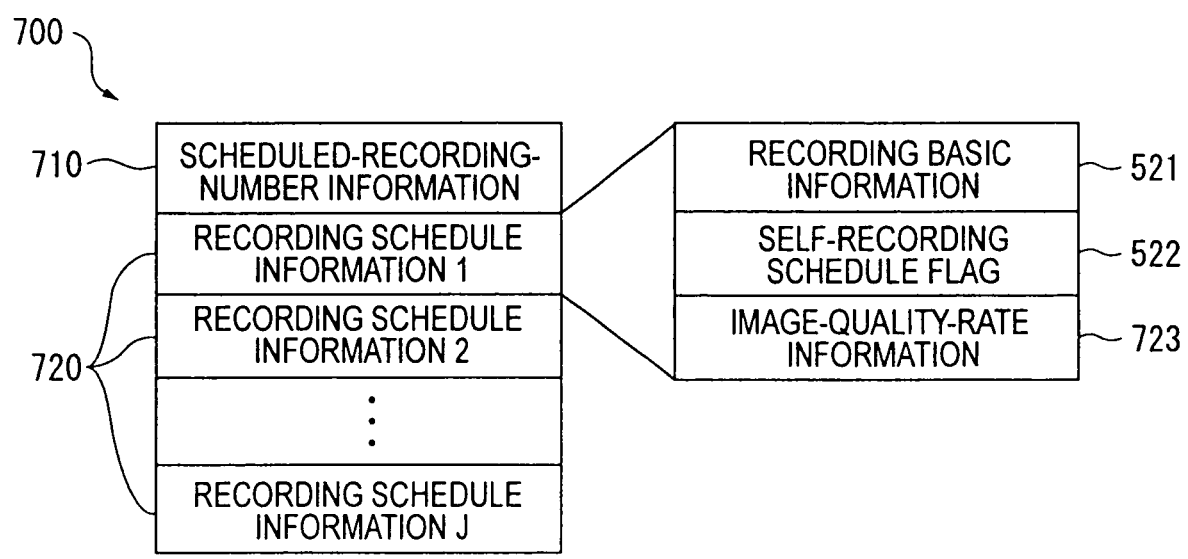
FIG. 4 is a schematic illustration showing a structure of a scheduled-recording list.

The memory 280 readably stores the various information that is necessary for retrieving the desired contents from the TS that is output by the NIM 211 to store or for reproducing the stored contents. In addition, the memory 280 readably stores data that is retrieved by the NIM 211 such as the latest EPG data. Further, the memory 280 readably stores recording schedule list information 500 as shown in FIG. 2, contents-administration list information 600 as shown in FIG. 3, a scheduled-recording list 700 as shown in FIG. 4, a keyword storage area for storing the keyword, and the like.

In an EPG storage area, the EPG described in the EPG data that is output from the OSD 16 (translator's comment: correctly, the OSD 240) to the memory 280. Herein, the EPG is data in which a channel, title, broadcasting start time, broadcasting end time, subtitle, genre, in-depth explanation and story line and the like of a broadcast program are described in a text format. And, a data size of the broadcast program is also stored.

The recording schedule list information 500 is information about a list of manually-scheduled recordings and self-scheduled recordings. The recording schedule list information 500 is a data unit in which schedule number information 510, at least one schedule information 520 and the like are associated.

The schedule number information 510 is information about the sum of the schedule information 520. The schedule number information 510 is added by one when a new manual recording-scheduling or a self recording-scheduling is set by the CPU 290 and is subtracted by one when a recording based on the manual recording-scheduling or the self recording-scheduling is completed.

The schedule information 520 is information about the manual recording-scheduling and the self recording-scheduling. The schedule information 520 is added to the recording schedule list information 500 when a new manual recording-scheduling or self recording-scheduling is set by the CPU 290 and is deleted from the recording schedule list information 500 when a recording based on the manual recording-scheduling or self recording-scheduling is completed. The schedule information 520 is a data unit in which recording basic information 521, a self-recording schedule flag 522 and the like are associated.

The recording basic information 521 contains various information required to perform the manually-scheduled-recording processing and the self-scheduled-recording processing. Specifically, the recording basic information 521 is a data unit in which information about a detail of a program such as a recording start date/time, recording end date/time, channel number, title, genre and a data size of the contents are associated. The recording basic information 521 is appropriately changed by the CPU 290.

The self-recording schedule flag 522 is flag information showing whether a recording processing based on the recording basic information 521 is the self-scheduled-recording processing or not. Concretely, when the self-recording schedule flag 522 is zero, the recording processing is not the self-scheduled-recording processing but the manual recording-scheduling process (translator's comment: correctly, the manually-scheduled-recording processing), and when the self-recording schedule flag 522 is one, the recording processing is the self-recording-scheduling process (translator's comment: correctly, the self-scheduled-recording processing).

The contents-administration list information 600 is information about a list of each information that corresponds to the contents stored in the HDD 270. The contents-administration list information 600 is a data unit in which at least one contents-administration information 610 is associated.

Based on the control of the CPU 290, the contents-administration information 610 is added to the contents-administration list information 600 when the contents is stored in the HDD 270 and is deleted from the contents-administration list information 600 when the contents is erased from the HDD 270. The contents-administration information 610 is a data unit in which a contents number 611, a self-erasing target flag 612 as data attribute information, a remaining time information 613, a storing date/time information 614 and a last update date/time information 615 are associated. Incidentally, the contents-administration information 610 may be a data unit in which the contents number 611 and the self-erasing target flag 612 are associated.

The contents number 611 is information about a number uniquely assigned to the contents stored in the HDD 270. As an alternative for the contents number 611, information such as a name that is uniquely assigned to the contents may be used.

The self-erasing target flag 612 is flag information showing whether the contents identified by the contents number 611 is a subject to be self-erased by the CPU 290. Specifically, when the self-erasing target flag 612 is zero, the contents is not the subject to be self-erased, and when the self-erasing target flag 612 is one, the contents is the subject to be self-erased. The self-erasing target flag 612 is reconfigured by the CPU 290.

The remaining time information 613 is information about a remaining time before the contents identified by the contents number 611 is self-erased. The remaining time information 613 is changed by the CPU 290.

The storing date/time information 614 shows a date/time when the contents identified by the contents number 611 is stored.

The last update date/time information 615 stores a date/time when the contents identified by the contents number 611 has been last updated. Herein, being updated means that the contents is accessed in a process such as storing or reproducing of the contents. Incidentally, a reproduction time by which the contents is regarded as reproduced can be freely set and, for instance, a setting in which the contents is regarded as updated when a part of the contents is reproduced and a setting in which the contents is regarded as updated when the entire contents is reproduced may be employed.

The scheduled-recording list 700 is generated based on the recording schedule list information 500. The scheduled-recording list 700 is a data unit in which scheduled-recording-number information 710 and at least one scheduled-recording information 720 are associated.

The scheduled-recording-number information 710 is information about the sum of the scheduled-recording information 720. The scheduled-recording-number information 710 is added by one when the CPU 290 stores the new scheduled-recording information 720 in the scheduled-recording list 700 and is subtracted by one when the recording based on the recording-scheduling is completed.

The scheduled-recording information 720 is information about the schedule information 520 to be actually recorded. Based on the control of the CPU 290, when the schedule information 520 to be actually scheduled for recording is selected, the scheduled-recording information 720 is stored in the scheduled-recording list 700 based on the selected schedule information 520 and is deleted from the scheduled-recording list 700 when the recording based on the manual recording-scheduling or self recording-scheduling is completed. The schedule information 520 that corresponds to the scheduled-recording information 720 being stored in the scheduled-recording list 700 is deleted from the recording schedule list information 500. The scheduled-recording information 720 is a data unit in which the recording basic information 521, the self-recording schedule flag 522, the image-quality-rate information 723 and the like are associated.

Since the recording basic information 521 and the self-recording schedule flag 522 of the scheduled-recording information 720 are same information as those stored in the schedule information 520, the explanation thereof will be omitted.

The image-quality-rate information 723 is information about image quality of a time when the scheduled-recording information 720 is recorded. The image-quality-rate information 723 is set to a low resolution when the free space of the contents storage area is small and set to a high resolution when the free space of the contents storage area is large, for instance.

In the keyword storage area of the memory 280, the keyword that is input by the user is stored. The keyword is, as described above, text data that is input by the user using the input device and the like.

In the memory 280, various programs and the like that are run on an OS (Operating System) for controlling the overall storing-reproducing unit 200 are also readably stored. As the memory 280, it is preferable to use a memory, such as a CMOS (Complementary Metal-Oxide Semiconductor), of which storage can be retained even if the power is suddenly shut down due to, for instance, a blackout. In addition, the memory 280 may include a drive or a driver that can readably store in a recording medium such as a HD, DVD and optical disc.

Figure 5:
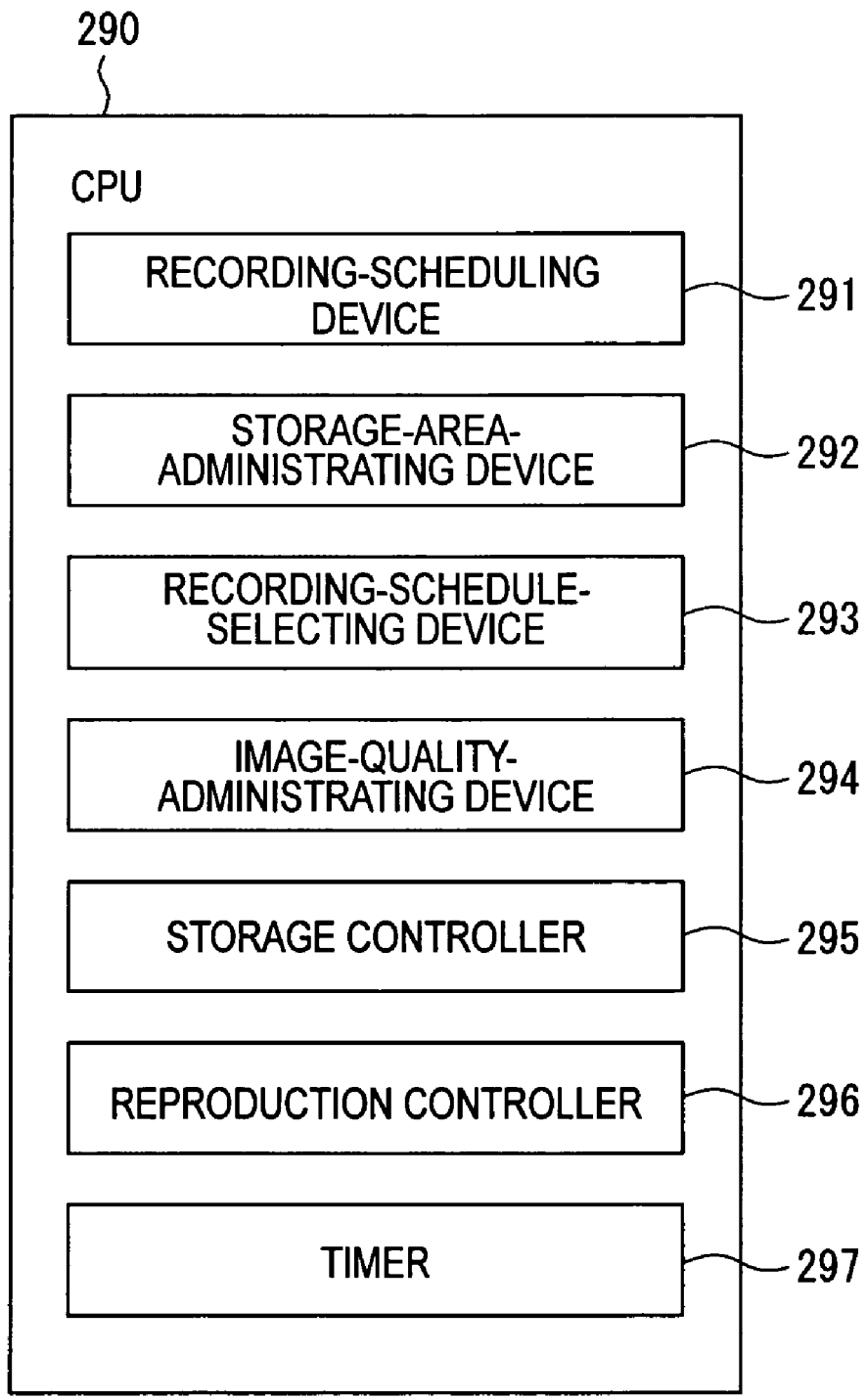
FIG. 5 is a schematic illustration showing a structure of a CPU that constitutes a storing-reproducing unit.

As shown in FIG. 4 (translator's comment: correctly, FIG. 5), the CPU 290 controls a recording-scheduling device 291 also working as a request-information recognizer and a detail-information-searching device, a storage-area-administrating device 292 also working as a storage-area recognizer and an information-retention controller, an recording-schedule-selecting device 293 also working as a storage controller, a storage controller 295, a reproduction controller 296, a timer 297 and the like.

The recording-scheduling device 291 recognizes the EPG and reads the keyword stored in the keyword storage area. And the recording-scheduling device 291 searches the EPG for program information as detail information that contains the keyword in order to retrieve and generates the schedule information 520 to store in the recording schedule list information 500.

The storage-area-administrating device 292 recognizes the free space of the contents storage area of the HDD 270 and judges whether the recognized free space is sufficient to store the contents. In detail, the storage-area-administrating device 292 compares a threshold value T that is preset as a capacity to be judged as sufficient for the free space of the contents storage area and the actual free space A of the contents storage area. If the free space A is smaller than the threshold value T, the storage-area-administrating device 292 judges that the free space of the contents storage area is not enough.

The recording-schedule-selecting device 293 selects the schedule information 520 to be actually recorded from the recording schedule list information 500 to generate the scheduled-recording information 720 and stores in the scheduled-recording list 700. At this time, the recording-schedule-selecting device 293 reads the contents-administration information 610 of the contents precedingly stored based on the schedule information 520 and recognizes the storing date/time information 614. The recording-schedule-selecting device 293 also recognizes information about the start time of the schedule information 520 stored in the recording schedule list information 500. The recording-schedule-selecting device 293 selects the schedule information 520 such that a time duration between the date/time that is described in the storing date/time information 614 of the precedingly recorded contents and the start time of the schedule information 520 of the to-be-subsequently-recorded contents (hereinafter referred as a recording timing duration) becomes equal to or longer than a predetermined time interval.

Specifically, the recording-schedule-selecting device 293 recognizes the data size as an information volume of the contents of the schedule information 520. The free space A of the contents storage area which is to be left after the to-be-recorded contents is stored in the contents storage area is calculated by the storage-area-administrating device 292. When the storage-area-administrating device 292 judges that the free space A of the storage area will be larger than the threshold value T, the recording-schedule-selecting device 293 selects the schedule information 520 of which recording timing duration is longer than, for instance, a standard contents-keeping duration L based on the remaining time information 613 of the contents-administration information. On the other hand, when the storage-area-administrating device 292 judges that the free space A of the storage area will be smaller than the threshold value T, the recording-schedule-selecting device 293 selects the schedule information 520 of which recording timing duration is longer than, for instance, a duration calculated by nL (1−A/T). Incidentally, the nL means a longest contents-keeping duration where the L is a typical duration for keeping the contents.

Figure 6:
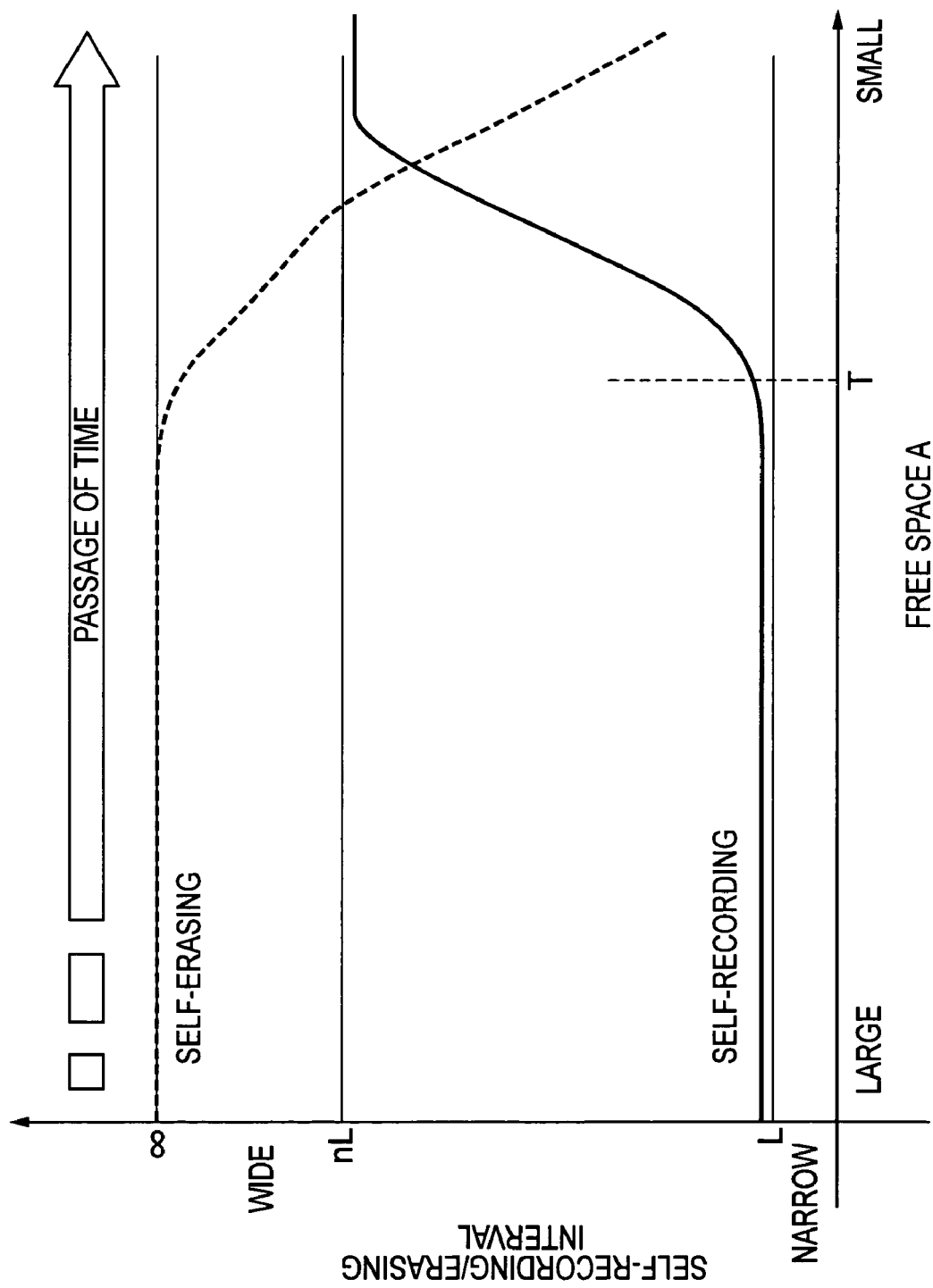
FIG. 6 is a graph illustrating a relationship between a free space of a contents storage area and a self-recording interval when a recording-schedule-selecting device selects schedule information.

FIG. 6 is a graph illustrating a relationship between the free space A of the contents storage area and a self-recording interval when the recording-schedule-selecting device 293 selects the schedule information 520. In FIG. 6, the contents is stored in the contents storage area at an interval of the recording timing duration which is equal to or longer than the standard contents-keeping duration L. When the free space A of the contents storage area is smaller than the threshold value T, the recording timing duration is set equal to or longer than the duration expressed by the nL (1−A/T). In other words, when the free space A becomes small, a shortest duration of the recording timing duration becomes longer and closer to the longest contents-keeping duration nL. Accordingly, no contents will be stored in the contents storage area based on the self-scheduled-recording processing in a short time. Since the recording timing duration is set equal to or longer than the standard contents-keeping duration, when the new contents is recorded based on the scheduled-recording information 720, the standard contents-keeping duration has already been elapsed and there exists the contents that is the subject to be self-erased. Therefore, even if the free space A of the contents storage area is not enough, the sufficient free space can be secured by deleting the subject contents for self-erasing, so that the new contents can be stored.

If the schedule information 520 is the schedule information 520 that has been stored based on the manual input by the user, the recording-schedule-selecting device 293 ensures that the free space A of the contents storage area is sufficient and stores in the scheduled-recording list 700. In this case, the recording-schedule-selecting device 293 selects the schedule information 520 set by the manual input regardless of an elapsed time from the storing date/time of the precedingly stored contents.

The image-quality-administrating device 294 adjusts the resolution of the video data of the to-be-stored contents. Specifically, the image-quality-administrating device 294 sets the image quality of the scheduled-recording information 720 selected by the recording-schedule-selecting device 293. For example, if the free space A of the contents storage area which is recognized by the storage-area-administrating device 292 is larger than the threshold value T, the image-quality-administrating device 294 sets an image-quality-rate determined by a resolution, a brightness and the like of an image to an image-quality-rate V of standard solution and brightness. In contrast, if the free space A of the contents storage area which is recognized by the storage-area-administrating device 292 is smaller than the threshold value T, the image-quality-administrating device 294 sets the image-quality-rate to a low-level image-quality-rate in which, for instance, the resolution of the contents is set low. However, since a lowest image-quality-rate W is preset by the image-quality-administrating device 294 beforehand, the low-level image-quality-rate will not be set lower than the lowest image-quality-rate W. The standard image-quality-rate and the low-level image-quality-rate can be any and changed based on the input by the user. For instance, when the resolution of the to-be-recorded contents is preferably not too low, the standard image-quality-rate V and the lowest image-quality-rate W are set such that a difference therebetween becomes small.

In addition, the image-quality-administrating device 294 can change the above-described image-quality-rates based on the detail of the contents. For instance, by reading information about a program genre that is described in the recording basic information 521 and the like, the image-quality-rate may be set high-level for movie and set low-level for journalism.

The storage controller 295 controls the communication device 210 also working as a detail-information recognizer and an information-retrieving device, the Demux 220, the memory unit 251 and the like such that the partial TS of the contents of the desired broadcast program is readably stored in the HDD 270. Concretely, the storage controller 295, based on the operation signal that is input from the input device 260, inputs in the memory unit 251 information for requesting that the partial TS of the desired contents is stored in the HDD 270. Further, the storage controller 295 recognizes the scheduled-recording information 720 of the scheduled-recording list 700 and a current time indicated by the timer 297 (described below), and when judging that the start time described in the scheduled-recording information 720 and the current time are identical, the storage controller 295 also inputs in the memory unit 251 information for requesting that the contents described in the scheduled-recording information 720 is stored in the contents storage area.

The reproduction controller 296 controls the Demux 220, the decoder 230, the reproducing unit 252 and the like to output the desired contents to the output device 300.

The timer 297 recognizes the current time based on a reference pulse such as an internal clock.

[Operation of Storage-Reproducing System]

An operation of the storing-reproducing system 100 will be described below in reference to attached drawings.

(Registration of Manually-Stored Schedule Information in Scheduled-Recording List)

Figure 7:
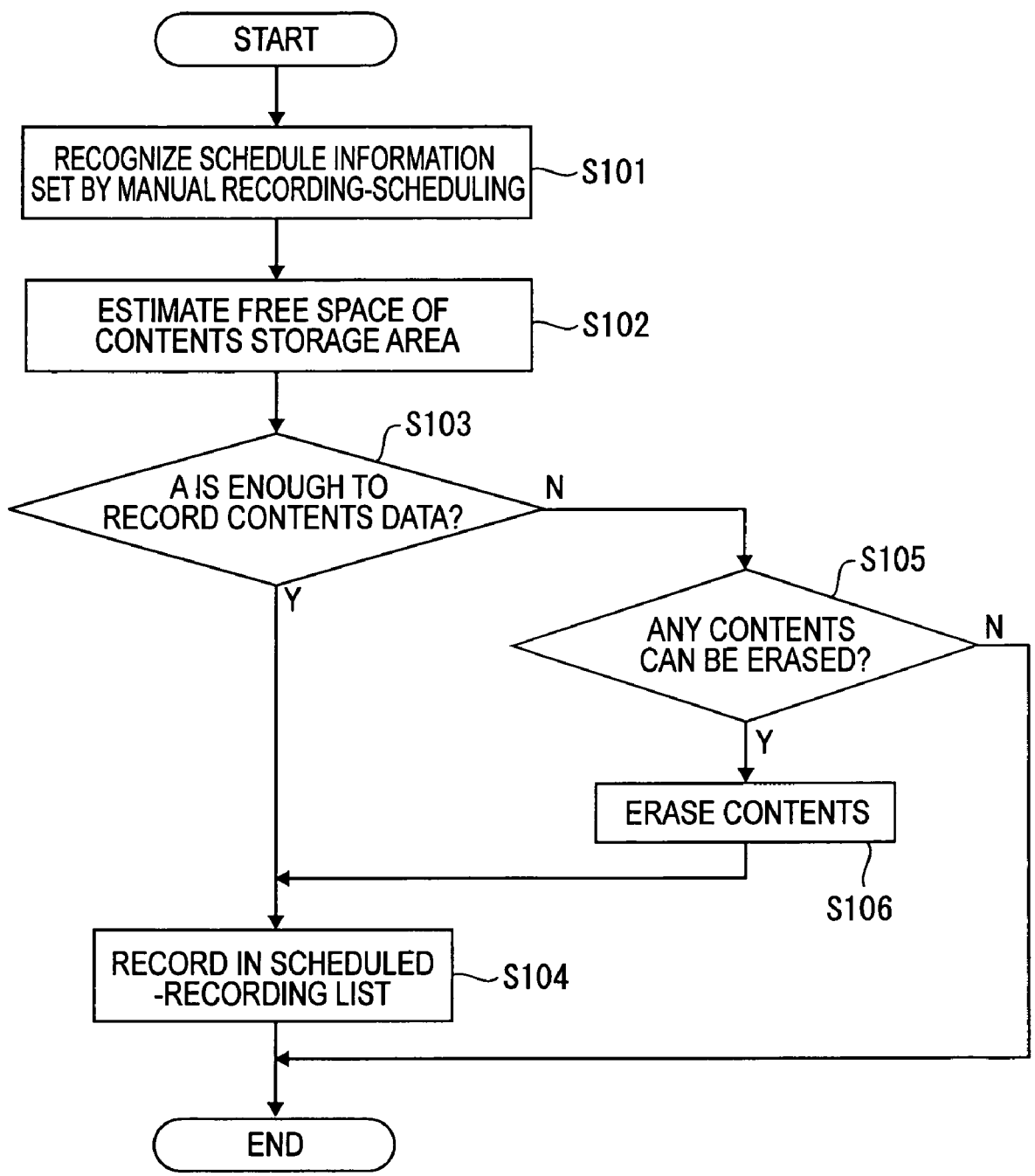
FIG. 7 is a flowchart showing a process for registering the schedule information that is manually scheduled for recording in the scheduled-recording list.

In reference to FIG. 7, a process for storing the schedule information 520 that is set based on the manual input by the user in the scheduled-recording list 700 will be described.

The recording-schedule-selecting device 293 of the CPU 290 reads the schedule information 520 in which information that the schedule information 520 has been set to the self-recording schedule flag 522 from the recording schedule list information 500 by the manual input is described (step S101).

Next, based on the control of the CPU 290, the storage-area-administrating device 292 calculates the free space A of the contents storage area (step S102). The broadcasting time length of the contents is also calculated using the start time, the end time and the like that are described in the recording basic information 521 of the schedule information 520 to roughly calculate the data size of the contents in accordance with the broadcast time length. And then, the free space A of the contents storage area calculated in the step S102 is compared with the rough data size of the contents (step S103). When the free space A is sufficiently larger than the data size of the contents, the schedule information 520 is stored in the scheduled-recording list 700 as the scheduled-recording information 720 (step S104). When the schedule information 520 of the recording-scheduling set by the manual input includes information about the image quality for recording the contents such as the resolution, the brightness and a luminance, the image-quality-rate information 723 is determined based on this information about the image quality for recording.

On the other hand, when the free space A of the contents storage area is not enough in the step S103, the recording-schedule-selecting device 293 checks whether or not the contents storage area contains the contents that can be erased/overwritten (step S105). In detail, the recording-schedule-selecting device 293 refers to the contents-administration list information 600 and recognizes the contents-administration information 610 having in the self-erasing target flag 612 information that the information 610 is the subject to be self-erased.

If no contents-administration information to be a target for self-erasing is found, the process for registering in the scheduled-recording list is ended. Herein, the CPU 290 may alternatively perform a process for displaying on the output device 300 a message informing that there is no free space in the contents storage area.

If recognizing the contents-administration information 610 having in the self-erasing target flag 612 the information that the information 610 is the subject to be self-erased in the step S105, the contents corresponding the contents-administration information 610 is erased (step S106). If the plurality of contents-administration information 610 are recognized in the step S105, the contents having the oldest date/time described in the last update date/time information is erased. When more free space A is to be secured, the contents having the secondly-old last update date/time is erased. After the sufficient free space A of the contents storage area is secured by erasing the contents, the schedule information 520 is stored in the scheduled-recording list 700 as the scheduled-recording information 720 by the process of the step S104.

(Registration of Self-Recording-Scheduled Schedule Information in Scheduled-Recording List)

Figure 8:
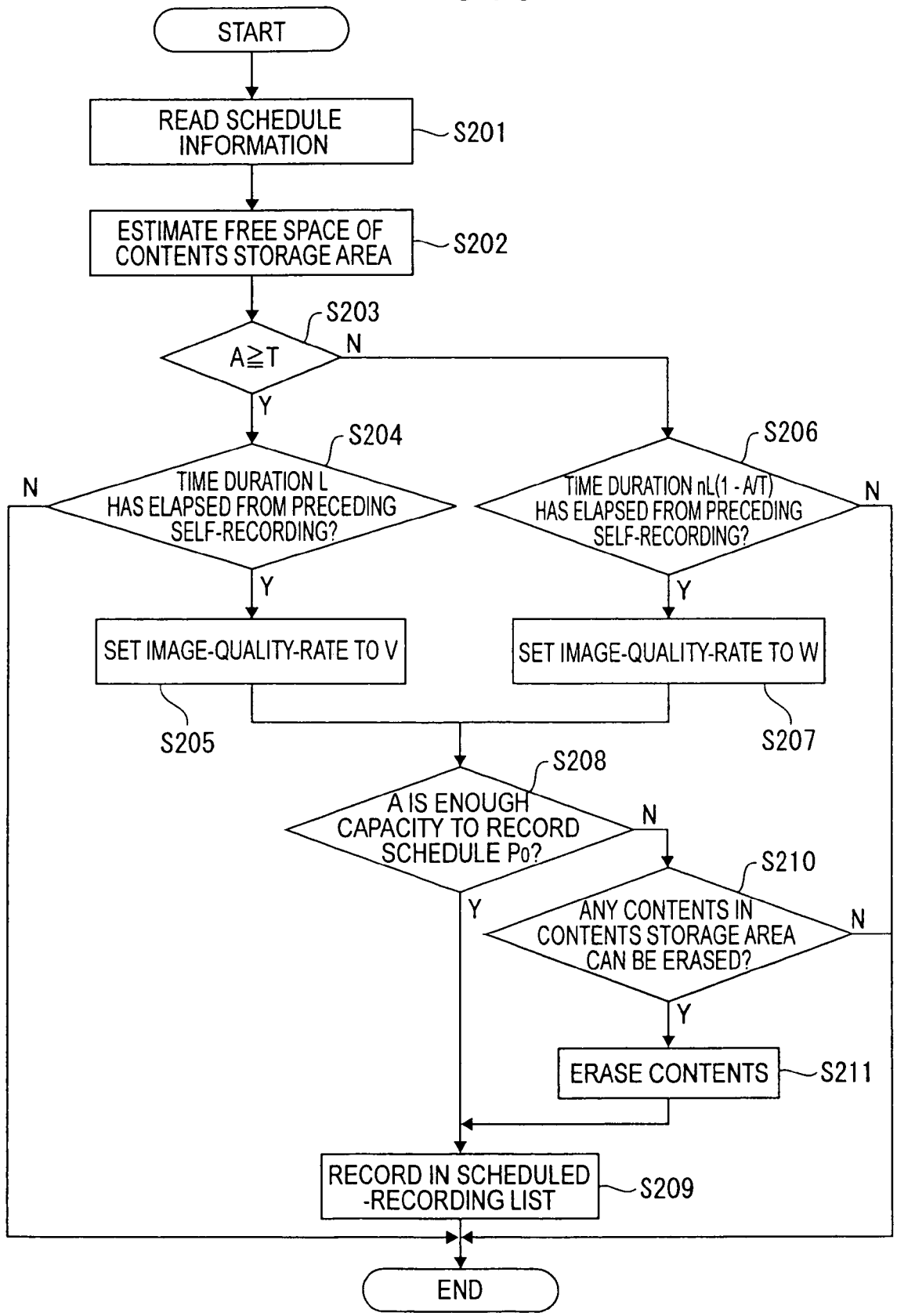
FIG. 8 is a flowchart showing a process for registering the schedule information that is self-scheduled for recording by the CPU in the scheduled-recording list.

In reference to FIG. 8, a process for storing the schedule information 520 of the self recording-scheduling that has been input by the CPU 290 in the scheduled-recording list 700 will be described.

The recording-schedule-selecting device 293 of the CPU 290 reads, from the recording schedule list information 500, the schedule information 520 in which information about the self recording-scheduling is described in the self-recording schedule flag 522 (step S201). Concretely, the recording-schedule-selecting device 293 reads the schedule information 520 in which, for instance, one that means being self recording-scheduled is described in the self-recording schedule flag 522.

Next, based on the control of the CPU 290, the storage-area-administrating device 292 calculates the free space A of the contents storage area (step S202). Herein, the storage-area-administrating device 292 reads the data size of the contents which is described in the recording basic information 521 of the schedule information 520. Alternatively, the broadcasting time length of the contents may be calculated using the start time, the end time and the like that are described in the recording basic information 521 of the schedule information 520 to roughly estimate the quantity of the contents in accordance with the broadcast time length. In addition, the free space A that will be left after the contents corresponding to the schedule information 520 is assumingly stored in the contents storage area is calculated by the storage-area-administrating device 292.

And then, the free space A calculated in the step S202 is compared with the preset threshold value T (step S203).

If the free space A of the contents storage area is larger than the threshold value T in the step S203, the recording-schedule-selecting device 293 reads the contents-administration information 610 of the precedingly stored contents from the contents-administration list information 600 and recognizes the storing date/time information 614 from the contents-administration information 610. The recording-schedule-selecting device 293 calculates a time duration from the date/time shown in the storing date/time information 614 and the broadcasting start time of the contents which is described in the schedule information 520 in order to obtain the recording timing duration (step S204). In the step S204, if the recording timing duration is shorter than the standard contents-keeping duration L, the process is ended. On contrary, if the recording timing duration is longer than the standard contents-keeping duration L, the standard image-quality-rate V is set as the image-quality-rate information 723 to be added to the schedule information 520 in order to generate the scheduled-recording information 720 (step S205).

If the free space A is smaller than the threshold value T in the step S203, the recording-schedule-selecting device 293 reads the contents-administration information 610 of the precedingly stored contents from the contents-administration list information 600 and recognizes the storing date/time information 614 from the contents-administration information 610. The recording-schedule-selecting device 293 calculates the time duration from the date/time shown in the storing date/time information 614 to the broadcasting start time of the contents which is described in the schedule information 520 in order to obtain the recording timing duration (step S206). In the step S206, if the recording timing duration is shorter than, for instance, the duration expressed by nL (1−A/T), the process is ended. If the recording timing duration is longer than the duration expressed by nL (1−A/T), the image-quality-rate information 723 is set to the low image-quality-rate V*(A/T) to be added to the schedule information 520 in order to generate the scheduled-recording information 720 (step S207).

Incidentally, the low image-quality-rate V*(A/T) cannot be set lower than the lowest image-quality-rate W.

Next, the recording-schedule-selecting device 293 of the CPU 290 then compares the data size of the contents of the schedule information 520 recognized in the step S202 and the free space A of the contents storage area (step S208). If the free space A is sufficient to store the contents of the scheduled-recording information 720, the scheduled-recording information 720 is stored in the scheduled-recording list 700.

On the other hand, when the free space A in the contents storage area is not enough in the step S208, the recording-schedule-selecting device 293 checks whether or not the contents storage area contains the contents that can be erased/overwritten (step S210). In detail, the recording-schedule-selecting device 293 refers to the contents-administration list information 600 and recognizes the contents-administration information 610 having information that the information 610 is the subject to be self-erased in the self-erasing target flag 612.

If no contents-administration information to be the subject for self-erasing is found, the process for registering in the scheduled-recording list is ended. Herein, the CPU 290 may alternatively perform the process for displaying on the output device 300 the message informing that there is no free space in the contents storage area.

On the other hand, if recognizing the contents-administration information 610 having the information that the information 610 is the subject to be self-erased in the self-erasing target flag 612 in the step S210, the contents corresponding the contents-administration information 610 is erased (step S211). If the plurality of contents-administration information 610 are recognized in the step S210, the contents having the oldest date/time described in the last update date/time information 615 is erased. When more free space A is to be secured, the contents having the secondly-old last update date/time is erased. After the sufficient free space A of the contents storage area is secured by erasing the contents, the scheduled-recording information 720 is stored in the scheduled-recording list 700 by the process of the step S209.

(Recording of Contents)

Figure 9:
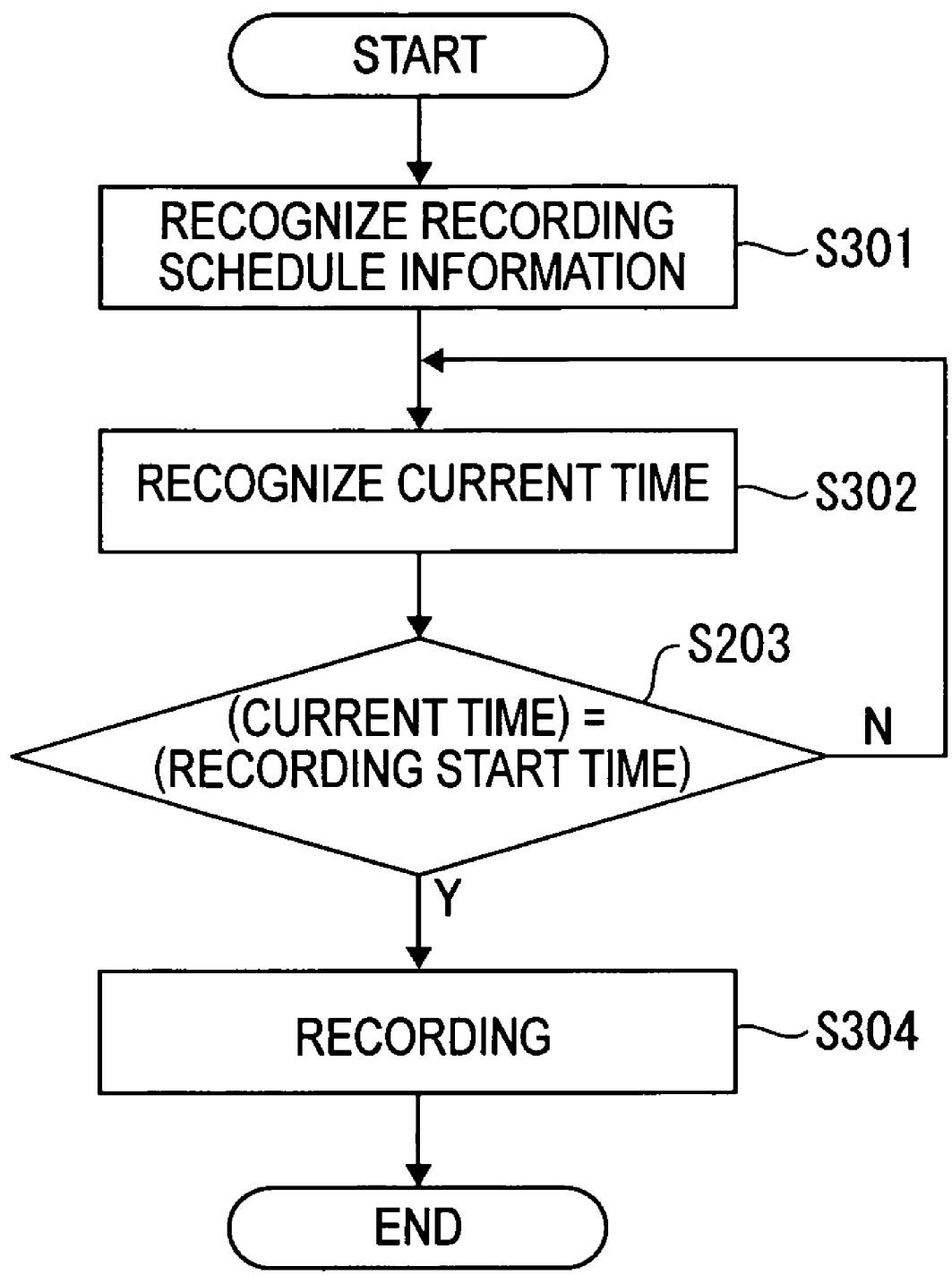
FIG. 9 is a flowchart showing a process for recording a contents using the scheduled-recording list.

A process for recording the contents will be described in reference to FIG. 9.

In the process for recording the contents, the storage controller 295 of the CPU 290 recognizes the scheduled-recording information 720 from the scheduled-recording list 700 (step S301). Herein, the storage controller 295 recognizes the recording basic information 521 to recognize the scheduled-recording information 720 having the earliest broadcasting start time of the contents.

Next, based on the control of the CPU 290, the current time is recognized by the timer 297 (step S302). And if the storage controller 295 recognizes that the current time recognized by the timer 297 and the broadcasting start time of the contents are identical (step S303), the storage controller 295 controls the memory unit 251 to store the partial TS of the contents in the HDD 270 (step S304).

(Effects of Embodiments)

In the above-described storing-reproducing system 100, the free space of the contents storage area is recognized by the storage-area-administrating device 292, the recording timing duration is set based on the recognized free space of the contents storage area, and the schedule information 520 of the contents to be recorded is selected from the plurality of schedule information 520 stored in the recording schedule list information 500. Accordingly, frequency of storing the contents in the contents storage area of the HDD 270 can be reduced, thereby preventing the contents which has not yet watched from being erased by self-erasing, so that the contents can be effectively recorded. Hence, the user can secure flexibility in time in watching the contents. In addition, frequency of writing and erasing the contents can be reduced, thereby avoiding a decrease in processing speed due to deterioration of the HDD 270, noise, a deterioration in image quality and the like.

The recording-schedule-selecting device 293 sets the recording timing duration for storing the contents to equal to or longer than the standard contents-keeping duration L when the free space of the contents storage area is larger than the threshold value T and sets the recording timing duration for storing the contents to nL (1−A/T) when the free space of the contents storage area is smaller than the threshold value T. Consequently, based on the free space of the storage area, when the free space is not sufficient, the frequency of storing the contents in the contents storage area can be reduced by selecting the schedule information 520 which recording timing duration is longer than the threshold value T. Therefore, the frequency of erasing the contents stored in the contents storage area by self-erasing is also reduced, thereby allowing the user to secure sufficient time to watch the newly stored contents.

Further, the recording-schedule-selecting device 293 sets the recording timing duration long when the free space of the contents storage area is smaller than the threshold value T in order to secure the free space of the contents storage area. Thus, since the free space is already secured by the time when, for instance, the user attempts to record by the manual input, the contents can be effectively stored without a necessity of erasing other existing contents.

The recording-schedule-selecting device 293 places priority on the recording of the contents corresponding to the schedule information 520 stored based on the input by the user and selects for recording prior to other contents. Accordingly, the contents selected by the user can be recorded with priority.

The recording timing duration is set to the standard contents-keeping duration L at shortest. Hence, when the contents is recorded based on the scheduled-recording information 720, there exists at least one contents which standard contents-keeping duration L has elapsed and the contents out of the standard contents-keeping duration L is regarded as the subject for self-erasing. Specifically, the timing when the already recorded contents is ready to be erased and the timing when the new contents is recorded can be simultaneous, so that the free space of the contents storage area can be secured effectively in a balanced manner.

The image-quality-administrating device 294 deteriorates the image-quality-rate i.e. the image quality such as the resolution to store the contents when the free space A of the contents storage area is smaller than the threshold value T. In other words, the data size of the contents can be reduced by deteriorating the image-quality-rate even if the free space of the contents storage area is small. Therefore, the free space of the contents storage area can be secured with the utmost efficiency.

(Modifications of Embodiments)

Though the present invention has been described above with reference to the embodiment, the scope of the invention is not limited thereto but includes various improvements and variations in the design as long as an object of the present invention can be achieved.

For example, in the above-described embodiments, when the schedule information 520 based on the self recording-scheduling is stored as the scheduled-recording information 720, if the free space of the contents storage area is not enough, the contents data that can be erased is self-erased, but the present invention is not limited thereto. The contents may not be self-erased but erased in accordance with the manual input by the user. In this arrangement, the user can freely erase the contents, preventing the contents which has not yet been watched from being self-erased.

Additionally, in the embodiment, the recording timing duration is determined based on the standard contents-keeping duration L, but the present invention is not limited thereto. The recording timing duration may be set to a longer duration, i.e., for instance, to the longest contents-keeping duration nL. In this case, when the new contents is recorded based on the self recording-scheduling, the longest contents-keeping duration nL of the contents precedingly recorded based on the self recording-scheduling has already elapsed, so that the contents is probably ready to be erased. Therefore, even if the free space of the contents storage area is not enough, it is possible to secure more free space by erasing the contents, avoiding a situation where no free space of the contents storage area is available.

Further, in the embodiment, selected is the schedule information 520 that has passed the standard contents-keeping duration L from the storing date/time of the precedingly recorded contents, but the present invention is not limited thereto. As an example, the schedule information may include priority information and the schedule information may be selected based on the priority information. In this arrangement, preference of the user may be judged from the contents that is often watched by the user in order to set the priority information. Specifically, when the schedule information is searched using the keyword, for instance, "news", the priority of a news program that the user often watches is set higher than other found schedule information. The recording-schedule-selecting device then stores the news program that the user often watches based on the priority information built on the preference of the user. Accordingly, the self-recording of the contents can be performed with an understanding of the preference of the user.

Alternatively, the user may select the schedule information of the contents to be the subject for recording from the schedule information of which standard contents-keeping duration L has elapsed from the storing date/time of the precedingly recorded contents. By employing this arrangement, only the contents of the user's choice is recorded, enabling further effective recording of the broadcast program.

As another arrangement, the schedule information 520 having a small data size may be selected from the recording schedule list information 500 to be stored as the scheduled-recording information 720. In this case, since the contents having the small data size is stored, the free space of the contents storage area can be sufficiently secured.

In the embodiment, the image-quality-administrating device 294 deteriorates the image-quality-rate i.e. the image quality such as the resolution in order to store the contents when the free space A of the contents storage area is smaller than the threshold value T, but the present invention is not limited thereto. For instance, sound quality of the contents may be alternatively deteriorated and other data attached to the contents such as character data may be partly deleted. By changing storing condition of several items such as the image quality and the sound quality, the data size of the contents can be smaller, thereby securing more free space of the contents storage area.

The data size may be reduced by raising compression ratio of the contents. In this arrangement, the contents is preferably compressed at a higher compression ratio when the contents is stored in the contents storage area, and decompressed when the contents is reproduced. Consequently, the image quality and the sound quality can be maintained, while the data size of the contents when being stored can be reduced. In other words, the contents can be effectively stored without deteriorating the image quality, the sound quality and the like of the contents.

Further more, in the embodiment, although the image-quality-rate of the to-be-stored contents is changed, but the present invention is not limited thereto. The free space of the contents storage area may be secured by, for instance, reconfiguring the image quality and sound quality of the contents already stored in the contents storage area. In this case, it is preferable to reduce the image quality and the sound quality of the contents having an old last update date/time.

In the embodiment, the recording-schedule-selecting device 293 selects the scheduled-recording information 720 such that the contents is always recorded with the recording timing duration equal to or longer than the standard contents-keeping duration L, but the present invention is not limited thereto. For example, the recording-schedule-selecting device may control the number of the to-be stored contents by setting the recording timing duration only in the case where the free space of the contents storage area becomes smaller than the preset threshold value T. By employing this arrangement, many contents of the programs containing the keyword of the user's choice can be stored when the free space of the contents storage area is sufficient, while the CPU can control such that the free space of the contents storage area is secured when the free space is small.

Lastly, in the embodiment, only the contents that is set to be self-erased in the self-erasing target flag 612 of the contents-administration information 610 is erased, but the present invention is not limited thereto. The contents may be erased in a chronological order (the contents of the oldest last update date/time first) without providing the self-erasing target flag 612.

Incidentally, a concrete structure and procedure of embodiment of the present invention can be also changed as long as the present invention can be achieved.

(Advantages of Embodiments)

As mentioned above, in the storing-reproducing system 100 of the present embodiment, the free space of the contents storage area is recognized by the storage-area-administrating device 292, the recording timing duration is set based on the recognized free space of the contents storage area, and the schedule information 520 of the contents to be recorded is selected from the schedule information 520 stored in the recording schedule list information 500. Accordingly, the frequency of storing the contents in the HDD 270 can be reduced, thereby preventing the contents which has not yet watched from being erased by self-erasing, so that the contents can be effectively recorded.

The priority application Number JP2004-164930 upon which this patent application is based is hereby incorporated by reference.

What is claimed is:

1. An information processor that controls a process for storing a content in a storing device, comprising:
    a request-information recognizer that recognizes request information for requesting the content to be stored in the storing device;
    a detail-information recognizer that recognizes detail information about detail of the content to be stored, the detail information containing data-size information about information quantity of the content;
    a storage-area recognizer that recognizes a volume of a free space of a storage area of the storing device; and
    a storage controller that controls a process for storing the content in the storing device based on the data-size information of the content to be stored and the volume of the free space of the storage area when the storage controller recognizes a request for storing a plurality of contents based on request information, wherein
    the storage controller selects and stores one of the plurality of contents when the volume of the free space of the storage area is less than a predetermined volume, the one of the plurality of contents being selected such that a time duration from a first storing timing to a second storing timing becomes equal to or longer than a standard contents-keeping duration, the first storing timing being a timing at which a previous content is stored, the second storing timing being a timing at which the one of the plurality of contents is to be stored, deletion of the previous content being restricted during the standard contents-keeping duration.

2. The information processor according to claim 1, wherein the storage controller compares the data-size information of the content to be stored and the volume of the free space of the storage area and controls the process for storing the content in the storing device in a state where more than a predetermined volume of the free space is left in the storage area.

3. The information processor according to claim 1, wherein the storage controller compares the sum of information quantity of the plurality of contents with the volume of the free space of the storage area, the information quantity being derived from the data size information of each of the plurality of contents.

4. The information processor according to claim 1, wherein the storage controller selects the content in accordance with a number that corresponds to a ratio of the volume of the free space of the storage area to the data-size information.

5. The information processor according to claim 1, wherein the storage controller selects the content so that the information quantity of the content corresponds to the ratio of the volume of the free space of the storage area to the data-size information.

6. The information processor according to claim 1, wherein the storage controller recognizes priority information about a priority in storing the content to be stored based on the request information and selects the content to be stored based on the priority information.

7. The information processor according to claim 1, wherein
    the storage controller recognizes storing-condition information for storing the content about a specific detail or the content about a predetermined detail, the storing-condition information being contained in the request information, and
    the storage controller controls the storing device to store the information content about the specific detail with priority.

8. The information processor according to claim 1, wherein
    the storage controller selects one of the plurality of detail information that corresponds to the plurality of contents to be stored by an information-retrieving device for retrieving the content based on the detail information,
    the storage controller controls the information-retrieving device to retrieve the content based on the selected detail information by the information-retrieving device, and
    the storage controller restricts the process for storing the content.

9. The information processor according to claim 8, wherein the storage controller recognizes retrieving condition for retrieving the content corresponding to the detail information that contains a keyword by the information-retrieving device or the content about the specific detail by the information-retrieving device, the retrieving condition being contained in the request information, and the storage controller controls the storing device to store the content about the specific detail with priority.

10. The information processor according to claim 1, wherein the storage controller changes a compression ratio of the content to be stored.

11. The information processor according to claim 1, wherein the storage controller changes storing condition of the content stored in the storing device to increase the ratio of the free space of the storage area to the sum of the information quantity of the data-size information.

12. The information processor according to claim 1, wherein the storage controller changes the storing condition by increasing the compression ratio of the content stored in the storing device.

13. The information processor according to claim 1, wherein the storage controller changes the storing condition by deleting at least a portion of the content stored in the storing device.

14. The information processor according to claim 13, wherein the storage controller changes the storing condition for each of the contents.

15. The information processor according to claim 1, wherein the content is contents data of a broadcast program; and
    the detail information is a program information.

16. An information storage, comprising: a storing device for storing a content and an information processor for controlling a process for storing the content in the storing device, wherein
    the information processor including includes:
    a request-information recognizer that recognizes request information for requesting the content to be stored in the storing device;
    a detail-information recognizer that recognizes detail information about detail of the content to be stored, the detail information containing data-size information about information quantity of the content;

a storage-area recognizer that recognizes a volume of a free space of a storage area of the storing device; and a storage controller that controls a process for storing the content in the storing device based on the data-size information of the content to be stored and the volume of the free space of the storage area when the storage controller recognizes a request for storing a plurality of contents based on request information, wherein the storage controller selects and stores one of the plurality of contents when the volume of the free space of the storage area is less than a predetermined volume, the one of the plurality of contents being selected such that a time duration from a first storing timing to a second storing timing becomes equal to or longer than a standard contents-keeping duration, the first storing timing being a timing at which a previous content is stored, the second storing timing being a timing at which the one of the plurality of contents is to be stored, deletion of the previous content being restricted during the standard contents-keeping duration.

17. An information-processing method for controlling a process for storing a content in a storing device using a computer, the method comprising the steps of the computer:

recognizing data-size information about information quantity of the content in accordance with detail information about a detail of the content to be stored and a volume of a free space of a storage area of a storing device upon recognizing the request for storing the plurality of contents based on the request information for requesting the content to be stored in the storing device; and controlling the process for storing the content in the storing device based on the recognized data-size information and the recognized volume of the free space of the storage area, wherein one of the plurality of contents is selected and stored when the volume of the free space of the storage area is less than a predetermined volume, the one of the plurality of contents being selected such that a time duration from a first storing timing to a second storing timing becomes equal to or longer than a standard contents-keeping duration, the first storing timing being a timing at which a previous content is stored, the second storing timing being a timing at which the one of the plurality of contents is to be stored, deletion of the previous content being restricted during the standard contents-keeping duration.

18. An information-processing program operating a computer as an information processor in order to control a process for storing a content in a storing device, wherein the information processor comprises:

a request-information recognizer that recognizes request information for requesting the content to be stored in the storing device;

a detail-information recognizer that recognizes detail information about detail of the content to be stored, the detail information containing data-size information about information quantity of the content;

a storage-area recognizer that recognizes a volume of a free space of a storage area of the storing device; and a storage controller that controls a process for storing the content in the storing device based on the data-size information of the content to be stored and the volume of the free space of the storage area when the storage controller recognizes a request for storing a plurality of contents based on request information, wherein the storage controller selects and stores one of the plurality of contents when the volume of the free space of the storage area is less than a predetermined volume, the one of the plurality of contents being selected such that a time duration from a first storing timing to a second storing timing becomes equal to or longer than a standard contents-keeping duration, the first storing timing being a timing at which a previous content is stored, the second storing timing being a timing at which the one of the plurality of contents is to be stored, deletion of the previous content being restricted during the standard contents-keeping duration.

19. An information-processing program operating a computer to execute an information-processing method in order to control a process for storing information a content in a storing device, the information-processing method comprising the steps of:

upon recognizing the request for storing a plurality of contents based on request information for requesting the content to be stored in the storing device, recognizing data-size information about information quantity of the content contained in detail information about a detail of the content to be stored and a volume of a free space of the storage area of the storing device; and controlling the process for storing the content in the storing device based on the recognized data-size information and the recognized volume of the free space of the storage area, wherein one of the plurality of contents is selected and stored when the volume of the free space of the storage area is less than a predetermined volume, the one of the plurality of contents being selected such that a time duration from a first storing timing to a second storing timing becomes equal to or longer than a standard contents-keeping duration, the first storing timing being a timing at which a previous content is stored, the second storing timing being a timing at which the one of the plurality of contents is to be stored, deletion of the previous content being restricted during the standard contents-keeping duration.

20. A recording medium, containing an information-processing program in a manner readable by a computer, the information-processing program operating the computer to work as an information processor to control a process for storing a content in a storing device, wherein the information processor includes:

a request-information recognizer that recognizes request information for requesting the content to be stored in the storing device;

a detail-information recognizer that recognizes detail information about detail of the content to be stored, the detail information containing data-size information about information quantity of the content;

a storage-area recognizer that recognizes a volume of a free space of a storage area of the storing device; and a storage controller that controls a process for storing the content in the storing device based on the data-size information of the content to be stored and the volume of the free space of the storage area when the storage controller recognizes a request for storing a plurality of contents based on request information, wherein the storage controller selects and stores one of the plurality of contents when the volume of the free space of the storage area is less than a predetermined volume, the one of the plurality of contents being selected such that a time duration from a first storing timing to a second storing timing becomes equal to or longer than a standard contents-keeping duration, the first storing timing being a timing at which a previous content is stored, the second storing timing being a timing at which the one of the plurality of contents is to be stored, deletion of the previous content being restricted during the standard contents-keeping duration.

21. A recording medium, containing an information-processing program in a manner readable by a computer, the information-processing program operating computer to execute an information-processing method to control a process for storing a content in a storing device, the method comprising the steps of:

upon recognizing a request for storing a plurality of contents based on a request information that requests the content to be stored in the storing device, recognizing data-size information related to information quantity of the content contained in detail information related to a detail of the content to be stored and a volume of a free space in a storage area of the storing device; and controlling the process for storing the content in the storing device based on the recognized data-size information and the recognized volume of the free space of the storage area, wherein one of the plurality of contents is selected and stored when the volume of the free space of the storage area is less than a predetermined volume, the one of the plurality of contents being selected such that a time duration from a first storing timing to a second storing timing becomes equal to or longer than a standard contents-keeping duration, the first storing timing being a timing at which a previous content is stored, the second storing timing being a timing at which the one of the plurality of contents is to be stored, deletion of the previous content being restricted during the standard contents-keeping duration.

* * * * *